United States Patent
Imai et al.

(10) Patent No.: US 11,163,310 B2
(45) Date of Patent: Nov. 2, 2021

(54) VEHICLE CONTROL DEVICE

(71) Applicant: HITACHI AUTOMOTIVE SYSTEMS, LTD., Hitachinaka (JP)

(72) Inventors: Masato Imai, Tokyo (JP); Takao Kojima, Tokyo (JP); Kentaro Yoshimura, Tokyo (JP); Kiyoshi Yorozuya, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 197 days.

(21) Appl. No.: 16/463,042

(22) PCT Filed: Dec. 7, 2017

(86) PCT No.: PCT/JP2017/043932
§ 371 (c)(1),
(2) Date: May 22, 2019

(87) PCT Pub. No.: WO2018/110400
PCT Pub. Date: Jun. 21, 2018

(65) Prior Publication Data
US 2019/0278280 A1   Sep. 12, 2019

(30) Foreign Application Priority Data

Dec. 15, 2016 (JP) .............................. JP2016-243209

(51) Int. Cl.
*G05D 1/02* (2020.01)
*B60K 31/00* (2006.01)
(Continued)

(52) U.S. Cl.
CPC ....... *G05D 1/0214* (2013.01); *B60K 31/0008* (2013.01); *B60W 30/09* (2013.01);
(Continued)

(58) Field of Classification Search
CPC ............ G05D 1/0214; B60W 50/0097; B60W 50/14; B60W 30/09; B60W 30/095;
(Continued)

(56) References Cited

U.S. PATENT DOCUMENTS 9,079,587 B1 * 7/2015 Rupp ................... B60W 40/06
2013/0218462 A1   8/2013 Miyamoto
(Continued)

FOREIGN PATENT DOCUMENTS

CN     105523042 A  *  4/2016  .......... G01C 21/365
DE  102005048398 A1 *  4/2007  ............ B60W 50/14
(Continued)

OTHER PUBLICATIONS

International Search Report with English translation and Written Opinion issued in corresponding application No. PCT/JP2017/043932 dated Mar. 20, 2018.

*Primary Examiner* — Atul Trivedi
(74) *Attorney, Agent, or Firm* — Foley & Lardner LLP

(57) ABSTRACT

The present invention provides a vehicle control device in which it is possible to modify the travel trajectory of a vehicle in response to the presence of an obstruction in the vehicle perimeter. In the present invention, the vehicle control device 1 recognizes the surroundings of the vehicle, detects a first branching point in a first route that is preset on a road, and in cases in which a prescribed condition is met by the presence of an obstruction detected from the recognized surroundings when the vehicle is to move along a travel trajectory that is based on at least one second route from among a plurality of second routes that branch from the first branching point, generates a virtual route which branches from the first route at a second branching point differing from the first branching point toward the selected
(Continued)

second route, and modifies the travel trajectory on the basis of the generated virtual route.

11 Claims, 11 Drawing Sheets

(51) Int. Cl.

| | | |
|---|---|---|
| *B60W 30/12* | (2020.01) | |
| *B60W 40/04* | (2006.01) | |
| *B60W 40/06* | (2012.01) | |
| *B60W 50/00* | (2006.01) | |
| *B60W 50/14* | (2020.01) | |
| *B60W 30/095* | (2012.01) | |
| *G08G 1/16* | (2006.01) | |
| *B60W 30/09* | (2012.01) | |
| *B60W 30/16* | (2020.01) | |
| *B60W 30/10* | (2006.01) | |
| *G06K 9/00* | (2006.01) | |

(52) U.S. Cl.
CPC .......... *B60W 30/095* (2013.01); *B60W 30/10* (2013.01); *B60W 30/12* (2013.01); *B60W 30/16* (2013.01); *B60W 40/04* (2013.01); *B60W 40/06* (2013.01); *B60W 50/0097* (2013.01); *B60W 50/14* (2013.01); *G08G 1/16* (2013.01); *B60T 2201/08* (2013.01); *G06K 9/00798* (2013.01); *G08G 1/166* (2013.01); *G08G 1/167* (2013.01)

(58) Field of Classification Search
CPC ...... B60W 30/10; B60W 30/12; B60W 30/16; B60W 40/04; B60W 40/06; B60K 31/0008; G08G 1/16
USPC ......................................................... 701/23
See application file for complete search history.

(56) References Cited

U.S. PATENT DOCUMENTS

| | | | |
|---|---|---|---|
| 2013/0226402 A1 | 8/2013 | Tsuruta | |
| 2015/0166062 A1* | 6/2015 | Johnson | B60W 10/20 |
| | | | 701/41 |
| 2019/0080601 A1* | 3/2019 | Kawabe | B60W 50/00 |
| 2019/0170522 A1* | 6/2019 | Matsunaga | G08G 1/096827 |
| 2019/0317508 A1* | 10/2019 | Zhang | G08G 1/096844 |
| 2019/0329766 A1* | 10/2019 | Ishioka | B60W 30/18163 |
| 2019/0359228 A1* | 11/2019 | Banno | B60W 40/072 |
| 2020/0116497 A1* | 4/2020 | Jiang | G01C 21/32 |
| 2020/0117207 A1* | 4/2020 | Zhang | B60W 60/001 |
| 2020/0125094 A1* | 4/2020 | Zhang | G05D 1/0212 |
| 2020/0189587 A1* | 6/2020 | Imai | B60W 30/095 |
| 2020/0398894 A1* | 12/2020 | Hudecek | G05D 1/0212 |
| 2021/0039650 A1* | 2/2021 | Yu | B60W 30/095 |
| 2021/0043088 A1* | 2/2021 | Yu | B60W 30/18163 |
| 2021/0188261 A1* | 6/2021 | Song | B60W 40/105 |

FOREIGN PATENT DOCUMENTS

| | | | | |
|---|---|---|---|---|
| JP | 2000-18956 A | 1/2000 | | |
| JP | 2007-155342 A | 6/2007 | | |
| JP | 2011-162132 A | 8/2011 | | |
| JP | 5062373 B1 | 10/2012 | | |
| JP | 2013-173383 A | 9/2013 | | |
| JP | 2018203031 A | * | 12/2018 | ......... B62D 15/0275 |
| KR | 20200083941 A | * | 7/2020 | ............ B60W 30/18 |
| WO | WO-2012073358 A1 | * | 6/2012 | ............ B60W 30/02 |
| WO | WO-2016031036 A1 | * | 3/2016 | ............ G08G 1/167 |
| WO | WO-2016110728 A1 | * | 7/2016 | ............ B60W 30/09 |
| WO | WO-2016110732 A1 | * | 7/2016 | ............ B60R 21/00 |

\* cited by examiner

VEHICLE CONTROL DEVICE

TECHNICAL FIELD

The present invention relates to a vehicle control device.

BACKGROUND ART

Techniques have been proposed for recognizing objects around a vehicle (vehicles, pedestrians, structures, etc.) using an outside recognition sensor such as an on-vehicle camera and radar or for recognizing road markings (such as road surface paint such as division lines) or road signs (such as "stop").

In addition, techniques have been proposed for controlling movement of a vehicle by using these techniques and for improving the security and comfort of occupants. In recent years, an automatic driving technique that automatically travels to a destination by automatically controlling steering and a speed of a vehicle attracts attention. In order to realize such an automatic driving technique, it is necessary to accurately determine traffic conditions and control a vehicle even under complicated traffic environments.

In performing automatic driving control for causing a vehicle to travel along a road, there is a technique for controlling automatic driving based on a state of a lane on which the vehicle is traveling (PTL 1). According to the technique described in PTL 1, when there are a plurality of lanes that vehicles can travel, by selecting a lane according to the situation, if a vehicle is traveling in a passing lane, the vehicle can change to a traveling lane, or if a lane on which the vehicle is traveling is congested, the vehicle can change to another lane. Thus, in PTL 1, when a vehicle is automatically driven, blocking traffic environments around the vehicle is prevented.

CITATION LIST

Patent Literature

PTL 1: JP 2011-162132 A

SUMMARY OF INVENTION

Technical Problem

In the technique of PTL 1, it is assumed that a vehicle and surrounding vehicles are traveling within lanes determined by division lines or the like. Therefore, for example, in the case where a vehicle row on a right-turn lane extends to a guiding zone (so-called zebra zone) before the vehicle row, automatic operation cannot be performed in consideration of the surrounding vehicles outside the lane, and there is a problem of disturbing the traffic flow.

The present invention has been made in view of the above problems, and it is an object of the present invention to provide a vehicle control device capable of changing a travel trajectory according to obstructions around the vehicle. It is a further object of the present invention to provide a vehicle control device that realizes automatic driving control without disturbing a traffic flow around the vehicle by considering surrounding vehicles outside the lane.

Solution to Problem

To solve the above problem, a vehicle control device according to the present invention is a vehicle control device that controls a travel trajectory of a vehicle based on a route determined in advance according to a road. The vehicle control device recognizes the surroundings of the vehicle, detects a first branching point in a first route that is preset on a road, and in cases in which a prescribed condition is met by the presence of an obstruction detected from the recognized surroundings when the vehicle is to move along a travel trajectory that is based on at least one second route selected from among a plurality of second routes that branch from the first branching point, generates a virtual route which branches from the first route at a second branching point differing from the first branching point toward the selected second route, and modifies the travel trajectory on the basis of the generated virtual route.

Advantageous Effects of Invention

According to the present invention, it is possible to generate a virtual route in accordance with the presence of an obstruction detected from the surroundings of a vehicle and to change a travel trajectory based on the virtual route.

DESCRIPTION OF EMBODIMENTS

Hereinafter, embodiments of the present invention will be described with reference to the drawings. A vehicle control device according to the embodiments realizes smooth and safe running control without disturbing a traffic flow around the own vehicle (a vehicle on which the vehicle control device is mounted). For this reason, the vehicle control device according to the embodiments automatically generates a route and a travel trajectory suitable for a traffic situation by changing a predetermined branching point in response to traffic conditions. Alternatively, the vehicle control device according to the present embodiment selects an obstruction as a follow-up target based on the result of predicting a route of the obstruction and a route of the own vehicle, and it also can control a travel trajectory to follow the obstruction.

In one configuration example of the present embodiment, in a vehicle control device that generates a travel trajectory of a vehicle based on a route determined in advance according to a road, the route is branched into a plurality of routes toward different points at a branching point determined in advance according to a road. When the vehicle moves along a travel trajectory based on one of a plurality of routes, the vehicle branches from a route at a position different from the branching point according to an obstruction around the vehicle, and changes a travel trajectory based on a virtual route heading for one route.

According to the present embodiment, it is possible to perform travel control in consideration of surrounding vehicles outside lanes prescribed in a map. Therefore, it is possible to realize smooth and safe automatic driving control without disturbing traffic flow around the own vehicle.

Note that the travel trajectory is a locus of the movement of a vehicle and is a concept without width. Thus, for example, a case where when a vehicle travels along a travel trajectory based on one of a plurality of routes, the vehicle may block passage of an obstruction moving based on the other route specifically means a case where "a traveling area (concept with a width) of a vehicle (own vehicle) determined from a travel trajectory (concept without a width) of the vehicle and a traveling area (concept with a width) of an obstruction (another vehicle) are overlap."

First Embodiment

Figure 1:
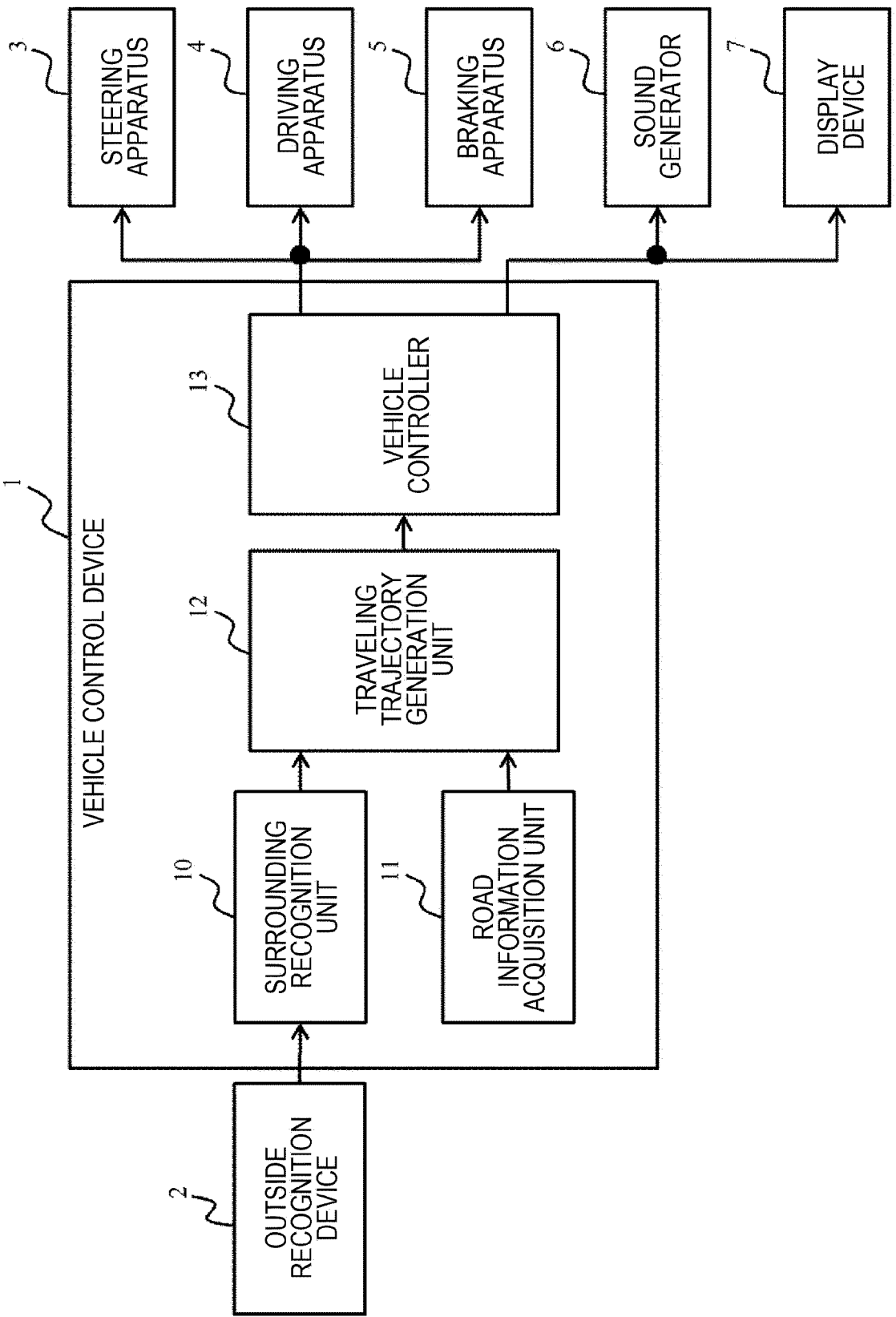
FIG. 1 is a functional block diagram of a vehicle control device.

Embodiments will be described with reference to FIGS. 1 to 8. FIG. 1 is a schematic configuration diagram of a vehicle control device 1 according to a first embodiment. In FIG. 1, the vehicle control device 1 and peripheral devices are indicated.

The vehicle control device 1 according to the present embodiment is configured as a computer system including, for example, a computing processing device, a storage device, an input/output circuit, a communication circuit (both are not illustrated), and the like. The vehicle control device 1 reads and executes a computer program stored in the storage device by the computing processing device, whereby a surrounding recognition unit 10, a road information acquisition unit 11, a travel trajectory generation unit 12, and a vehicle controller 13 are realized.

The vehicle control device 1 is connected to, for example, an outside recognition device 2, a steering apparatus 3, a driving apparatus 4, a braking apparatus 5, a sound generator 6, and a display device 7. Further, the vehicle control device 1 is connected to a CAN (not illustrated) or the like which is a communication network of the own vehicle. Vehicle information such as a vehicle speed, a steering angle, a yaw rate and the like are input to the vehicle control device 1 from a sensor group (not illustrated) provided in the own vehicle via the CAN. The CAN (Controller Area Network) is a network standard for connecting onboard electronic circuits and devices.

The outside recognition device 2 is a device for acquiring information on the surrounding environment of the own vehicle. Examples of the outside recognition device 2 include an in-vehicle stereo camera for photographing the front of the own vehicle, and four in-vehicle cameras for photographing the surroundings in the front side, the rear side, the right side, and the left side of the own vehicle.

These in-vehicle cameras use acquired image data to detect the shape and position of an object around the own vehicle. That is, the in-vehicle camera detects the shape and position of objects such as road surface paint, traffic signs, etc. such as stationary three-dimensional objects around the vehicle, moving objects, lane marking lines, and the like. In addition, the in-vehicle camera has a function of detecting irregularities or the like on a road surface and determining whether or not the own vehicle is on a road surface on which the vehicle can travel. A stationary three-dimensional object is, for example, a parked vehicle, a wall, a pole, a pylon, a curbstone, a wheel stopper, or the like. A moving object is, for example, a pedestrian, a bicycle, a motorcycle, a vehicle, or the like.

The in-vehicle camera may detect the presence or absence of lighting of a brake lamp or direction indicator, presence or absence of a person in a vehicle, and the like as information for estimating the state of a moving object. Hereinafter, two of the stationary three-dimensional object and the moving object are collectively called an obstruction. Vehicles other than the own vehicle can also be referred to as movable obstructions.

The shape and position of the object can be detected, for example, by using a pattern matching technique or other known techniques. The position of the object is expressed, for example, by using a coordinate system having an origin at the position of an in-vehicle camera for photographing the front of the own vehicle. Then, information such as the type, distance and direction of the obtained object is output to the vehicle control device 1 using a leased line, a CAN or the like.

Note that it is possible to output the image obtained by an in-vehicle camera to the vehicle control device 1 using a leased line or the like and process the image data in the vehicle control device 1. In addition to the in-vehicle camera, for example, a radar for measuring a distance to an object using a millimeter wave or a laser, or a sonar for measuring a distance to an object using ultrasonic waves or the like can be used. Information including a distance to an object obtained by a radar, a sonar or the like and a direction of the object can be output to the vehicle control device 1 using a leased line, a CAN or the like. Furthermore, a communication device for communicating with the outside of the own vehicle may be included in the outside recognition device 2. By using the outside recognition device 2 having a communication device, communication between vehicles and communication between a vehicle and a roadside device can be performed. That is, the outside recognition device 2 having a communication device can communicate with vehicles around the own vehicle to exchange information such as a location and speed, etc., or communicate with a roadside communication device to exchange information (such as information on an obstruction in a blind spot of the own vehicle) that cannot be detected from a sensor mounted on the own vehicle.

The steering apparatus 3 is a device that controls a moving direction of a vehicle (own vehicle). The steering apparatus 3 includes a power steering or the like controlled by an external drive command. Examples of power steering include an electric power steering that controls a snake angle with an electric actuator, and a hydraulic power steering that controls a steering angle with a hydraulic actuator.

The driving apparatus 4 is an apparatus for driving a vehicle. The driving apparatus 4 includes, for example, an engine system capable of controlling an engine torque with an electric throttle or the like by a drive command from the outside, an electric power train system or the like capable of controlling a driving force with an electric motor or the like by an external drive command.

The braking apparatus 5 includes a brake or the like which can be controlled by an external braking command. Examples of a brake include an electric brake that can control a braking force with an electric actuator, a hydraulic brake that can control a braking force with a hydraulic actuator, and the like.

The sound generator 6 includes a speaker or the like, and is used for outputting warnings, voice guidance, etc. to an occupant such as a driver.

The display device 7 includes, for example, a display such as a navigation device, a meter panel, a warning lamp, and the like. The display device 7 displays an operation screen of the vehicle control device 1 and also displays a screen on which a traveling state of the own vehicle can be visually expressed.

The road information acquisition unit 11 acquires map data of the surroundings of the current location of the own vehicle. The map data to be acquired includes shape data close to the actual road shape expressed by polygons and polylines and data of such as traffic regulation information (a speed limit, a type of vehicles allowed to pass, etc.), a lane classification (traveling lane, passing lane, climbing lane, straight lane, and left-turn lane, right-turn lane, etc.), and whether or not there are traffic lights or signs (if any, location information thereof).

Based on information related to the shape and position of an object detected by the outside recognition device 2 and the determination result as to whether or not the own vehicle can travel on a road surface, for example, if the vehicle travels on a general road, the surrounding recognition unit 10 detects a travelable lane position, a turnable space at an intersection, and the like.

In addition, the surrounding recognition unit 10 has a function of predicting future behavior from the current state of a movable object detected by the outside recognition device 2 around the own vehicle. For example, the surrounding recognition unit 10 can predict whether a vehicle parked on a road shoulder is a vehicle parked on a road or a vehicle waiting for left turn. Furthermore, the surrounding recognition unit 10 can predict whether a vehicle in a guiding zone (zebra zone) is a vehicle waiting for right turn. The surrounding recognition unit 10 predicts the behavior of the movable object around the host vehicle using map data acquired by the road information acquisition unit 11 and the vehicle state detected by the outside recognition device 2 (for example, a lighting state of a turn indicator, etc.).

Furthermore, the surrounding recognition unit 10 has a function of changing a branching point on a route or generating a virtual route, based on the information detected by the outside recognition device 2, with respect to the map data acquired by the road information acquisition unit 11.

The travel trajectory generation unit 12 generates a trajectory for moving the own vehicle from the current vehicle position to a target position. The travel trajectory generation unit 12 generates a travel trajectory from route information based on lane information of the map data acquired by the road information acquisition unit 11. Furthermore, the travel trajectory generation unit 12 calculates a target speed for moving the generated travel trajectory by using information such as a speed limit, a curvature of a route, traffic lights, stop positions in the map data, and the speed of a preceding vehicle.

The vehicle controller 13 controls the own vehicle along a travel trajectory generated by the travel trajectory generation unit 12. The vehicle controller 13 calculates a target steering angle and a target speed based on a travel trajectory. When a collision between the own vehicle and an obstruction is predicted, the target steering angle and the target speed are calculated such that the own vehicle does not collide with the obstruction. Then, the vehicle controller 13 outputs the target steering torque for realizing the target steering angle to the steering apparatus 3. Further, the vehicle controller 13 outputs a target engine torque and a target brake pressure for achieving a target speed to the driving apparatus 4 and the braking apparatus 5. Further, when calculating the target steering angle and the target speed such that the own vehicle does not collide with an obstruction and when traveling based on a virtual route generated by the surrounding recognition unit 10, driving support contents and the like are output to the sound generator 6 and the display device 7.

Figure 2:
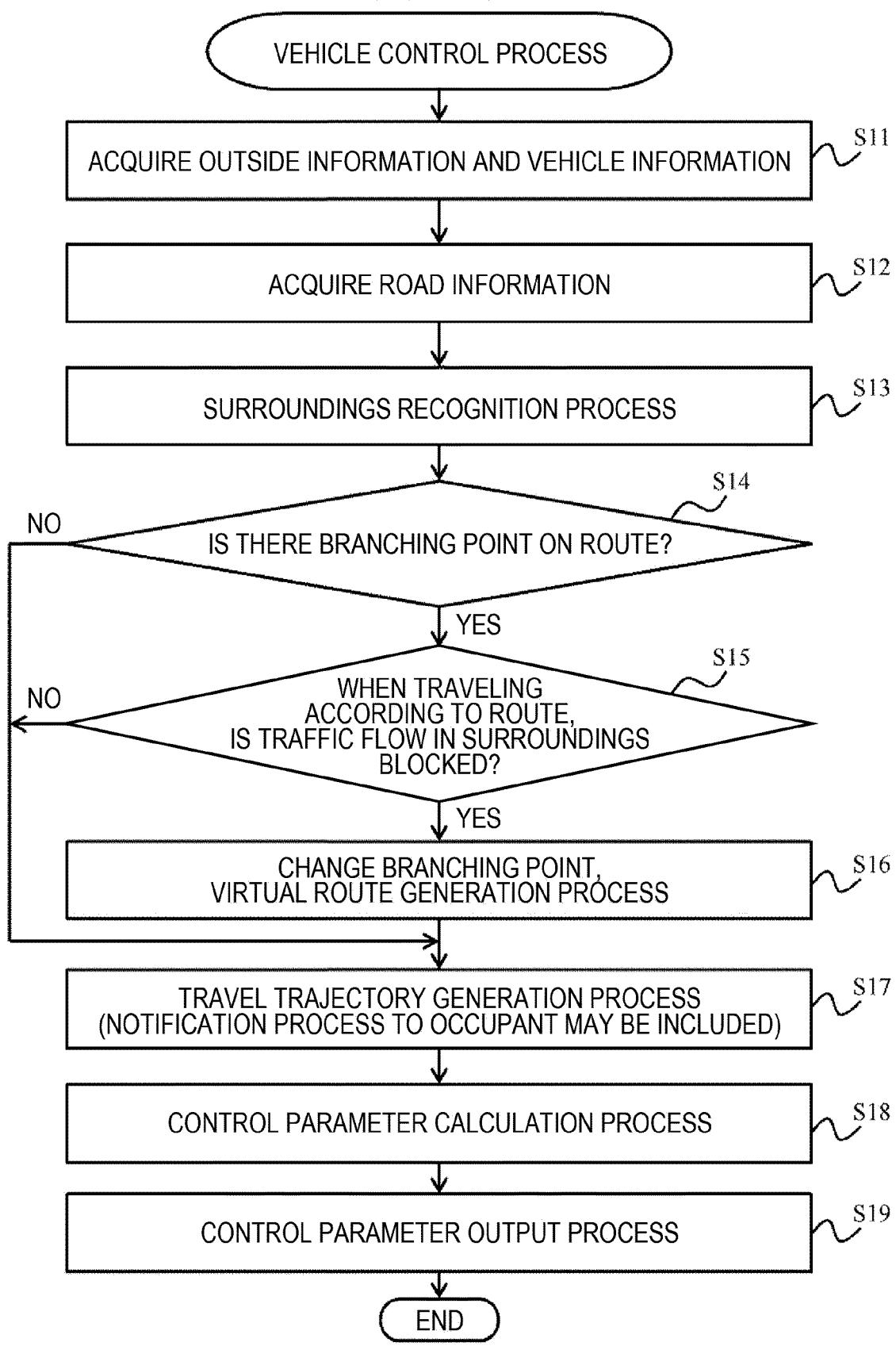
FIG. 2 is a flowchart of a vehicle control process.

An example of a processing procedure of the vehicle control device 1 will be described with reference to the flowchart of FIG. 2.

In step S11, the vehicle control device 1 acquires outside information and vehicle information, and the process proceeds to step S12. The outside information is information input by the outside recognition device 2. The vehicle information is information such as a vehicle speed, a steering angle, a yaw rate, and the like of the own vehicle.

In step S12, the vehicle control device 1 acquires road information, and the process proceeds to step S13. The road information is current map data in the vicinity of the own vehicle. The map data includes shape data close to the actual road shape expressed by polygons and polylines and data of such as traffic regulation information (a speed limit, a type of vehicles allowed to pass, etc.), a lane classification (traveling lane, passing lane, climbing lane, straight lane, and left-turn lane, right-turn lane, etc.), and whether or not there are traffic lights or signs (if any, location information thereof).

In step S13, the vehicle control device 1 executes a process for grasping the traveling environment around the own vehicle using the outside information acquired in step S11 and the road information acquired in step S12, and the process proceeds to step S14. Specifically, the vehicle control device 1 arranges outside information such as obstructions on the map data, and detects a lane position at which the own vehicle can travel, a turnable space at the intersection, and the like.

In step S14, the vehicle control device 1 determines whether or not there is a branching point on a route in front of the own vehicle. When there is a branching point (S14: YES), the process proceeds to step S15. When there is no branching point (S14: NO), the process proceeds to step S17.

In step S15, the vehicle control device 1 determines whether there is a possibility of blocking surrounding traffic flow when the vehicle is traveling along a route. When there is a possibility of blocking surrounding traffic flow (S15: YES), the process proceeds to step S16. When there is no possibility of blocking surrounding traffic flow (S15: NO), the process proceeds to step S17.

In step S16, the vehicle control device 1 changes a branching point on the route and performs the process of generating a virtual route, and the process proceeds to step S17.

In step S17, the vehicle control device 1 generates a travel trajectory based on the route, and the process proceeds to step S18. When changing a travel trajectory, the vehicle control device 1 may notify an occupant the change by using the sound generator 6 or the display device 7.

In step S18, the vehicle control device 1 calculates control parameters for causing the host vehicle to travel according to the travel trajectory generated in step S17, and the process proceeds to step S19. The control parameters include, for example, a target steering torque, a target engine torque, and a target brake pressure.

In step S19, the vehicle control device 1 outputs each of the control parameters calculated in step S18 to the steering apparatus 3, the driving apparatus 4, and the braking apparatus 5. In this manner, a series of vehicle control processes described above normally ends.

The control parameters to be output to the steering apparatus 3 may include a target steering torque for realizing the target steering angle, but it is also possible to directly output the target steering angle depending on the configuration of the steering apparatus 3. As the control parameters to be output to the driving apparatus 4 and the braking apparatus 5, there are a target engine torque for realizing a target speed, a target brake pressure, etc. However, depending on the configuration of the driving apparatus 4 and the braking apparatus 5, it is also possible to output a target speed directly.

Figure 4:
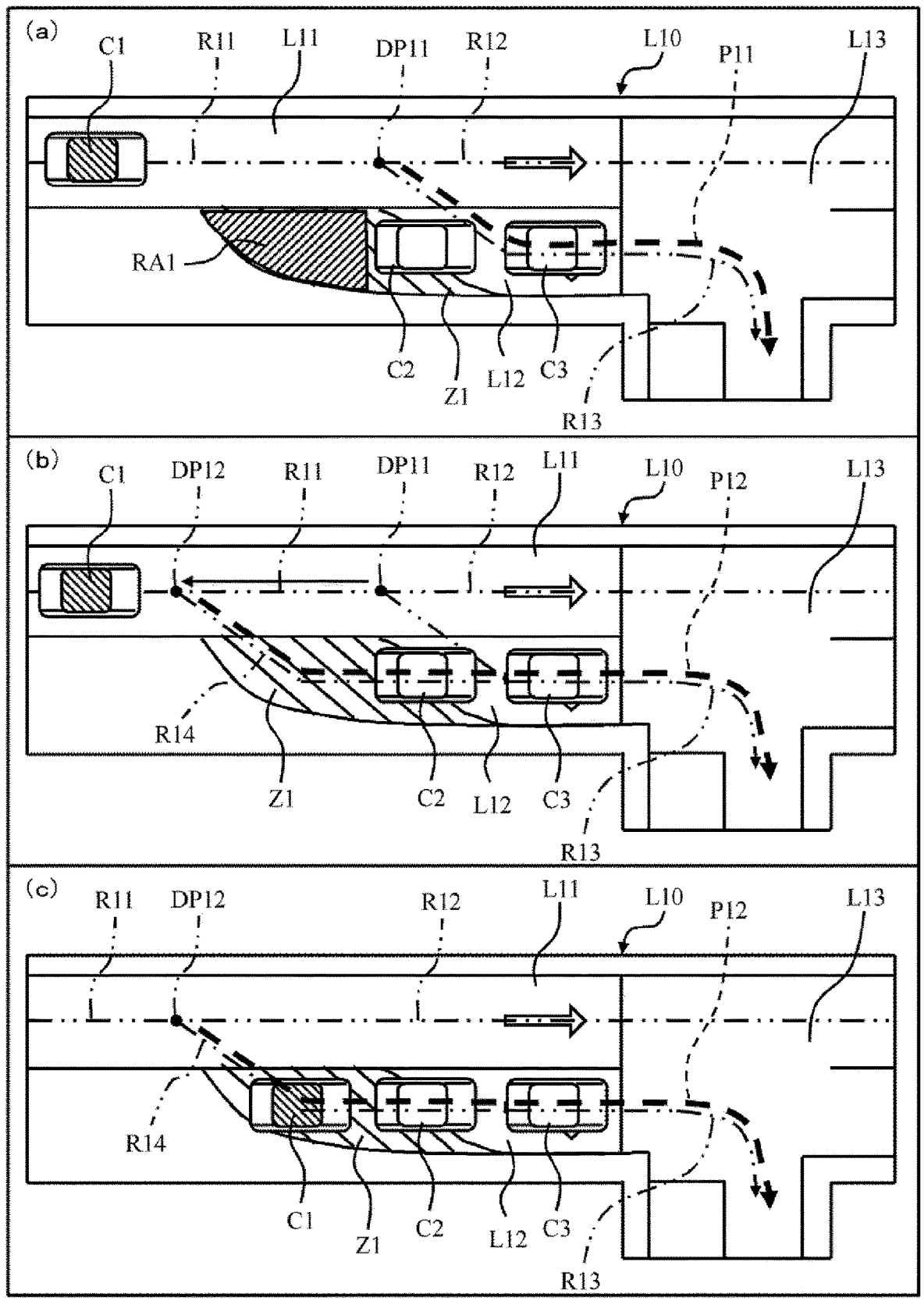
FIG. 4 illustrates explanatory views of an example of changing a travel trajectory in consideration of an obstruction.
Figure 5:
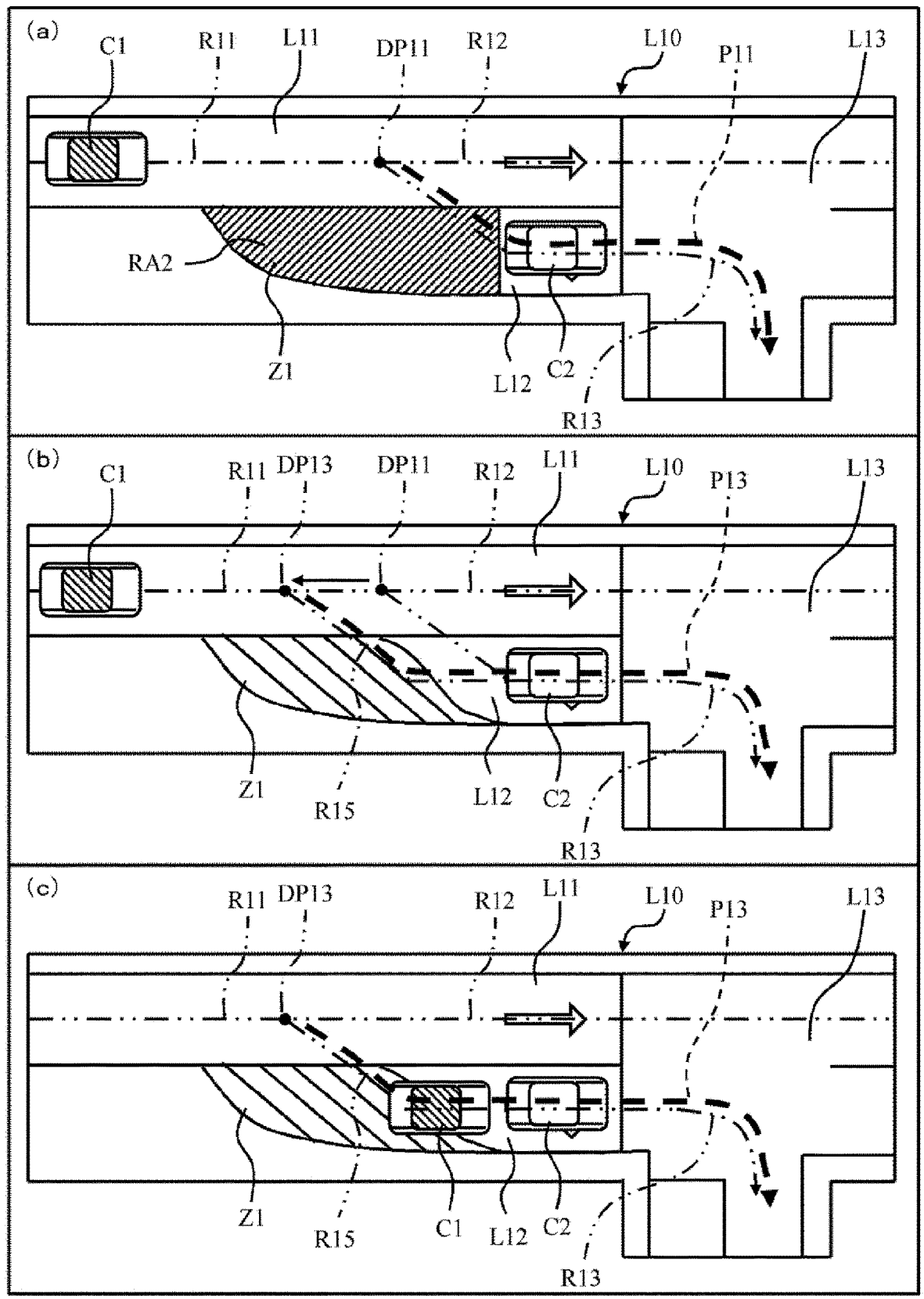
FIG. 5 illustrates explanatory views of another example of changing a travel trajectory in consideration of an obstruction.

Next, an operation example of the present embodiment will be described with reference to FIGS. 3 to 8. First, FIGS. 3 to 5 are diagrams for explaining a scene assuming that an own vehicle C1 tries to change a lane to a right-turn lane L12 to make a right turn at an intersection L13 in front while the own vehicle C1 is traveling on a single lane road L11.

Figure 3:
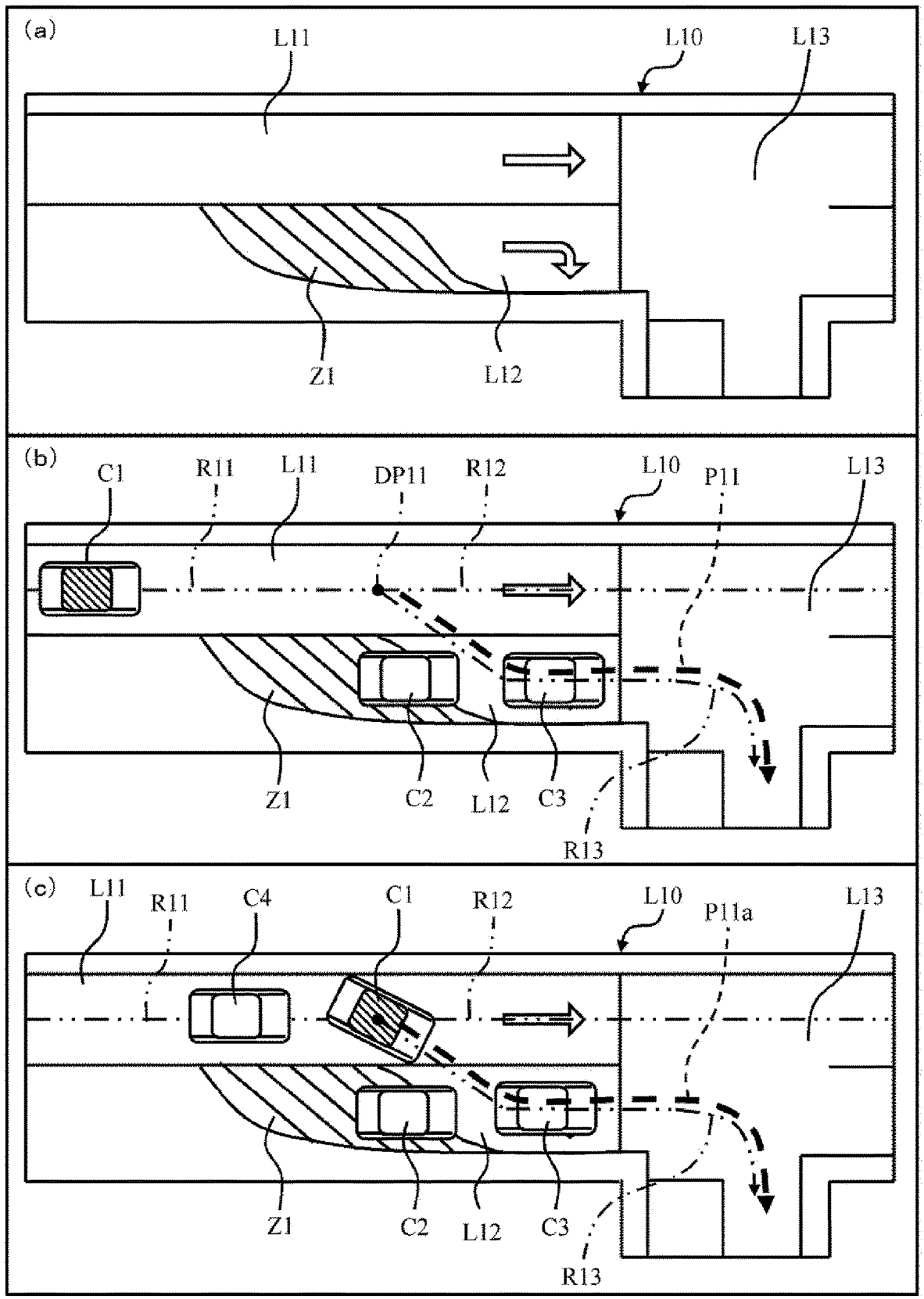
FIG. 3 illustrates explanatory views of a case where a vehicle turns right without considering an obstruction (another vehicle).

FIG. 3 is a problem scene when traveling by generating a travel trajectory from map information. FIG. 3(a) indicates the configuration of a road L10. On the right side in the traveling direction of a lane —L1, the right-turn lane L12 is provided in the vicinity of the intersection L13. On the rear side of the right-turn lane L12, a guiding zone Z1 is provided.

As illustrated in FIG. 3(b), if the own vehicle C1 comes close to an intersection, the route information obtained from a map is branched into a straight route R11 from the position of the own vehicle C1 to the start of the right-turn lane L12, a straight route R12 which continues the route R11 from the route R11 via a branching point DP11, and a route R13 to turn right from the right-turn lane L12. The route R11 before the branching point DP11 corresponds to the "first route." The routes R12 and R13 after the branching point DP11 correspond to the "second route."

Here, when the travel trajectory of the own vehicle C1 is generated based on the information on the route of the map, the travel trajectory P11 is generated. However, in the case of the scene illustrated in FIG. 3, vehicles C2 and C3 waiting for right turn are on the right-turn lane L12 and on the guiding zone Z1 before the right-turn lane L12. Therefore, when the own vehicle C1 moves along the travel trajectory P11, as illustrated in FIG. 3(c), the own vehicle C1 cut in between the vehicles C2 and C3 waiting for right turn and blocks the route of the vehicle C2. Furthermore, if the own vehicle C1 stops at a position where it intends to cut in the right-turn lane L12, it also blocks the route of the other vehicle C4 following the own vehicle C1. The travel trajectory at the position of the own vehicle C1 in FIG. 3(c) is as indicated in P11a.

FIG. 4 is an example in which a vehicle control process of the present embodiment is applied to the problem scene in FIG. 3. In FIG. 4(a), when the vehicle control device 1 confirms that there is the branching point DP11 on the route ahead of the own vehicle C1, it predicts future behavior of the vehicle C2 detected in front of the own vehicle C1. The vehicle C2 is located on the guiding zone Z1, and a right-turn lane L12 is present ahead of the guiding zone Z1. Therefore, the vehicle control device 1 can predict that the vehicle C2 is a vehicle which will turn right at the next intersection L13.

When the own vehicle C1 generates a travel trajectory with the information obtained from a route on the map, the vehicle cuts in in front of the vehicle C2 waiting for right turn like the travel trajectory P11 described in FIG. 3(c). Therefore, if the vehicle control device 1 continues to move while keeping the travel trajectory P11 based on the map information, the vehicle control device 1 determines that the vehicle disturbs surrounding traffic flow, and the process shifts to a process for changing a branching point. In such a scene, the own vehicle C1 should follow the rear side of the vehicle C2, such that the vehicle control device 1 determines a travelable area behind the vehicle C2 waiting for right turn. In the example of FIG. 4, since the rear side of the vehicle C2 is the guiding zone Z1, the own vehicle C1 can travel in the guiding zone Z1. Therefore, the vehicle control device 1 extracts an area from the rear side of the vehicle C2 for waiting right turn, which is an obstruction in front, to the start position of the guiding zone Z1 as the travelable area RA1.

When the travelable area RA1 can be extracted, the vehicle control device 1 changes the branching point DP11 defined by the map to a branching point DP12 directed to the start position of the travelable area RA1 as illustrated in FIG. 4(b). Then, the vehicle control device 1 generates a virtual route R14 from the branching point DP12 and connects the virtual route R14 to the right-turn route R13 on the map. The vehicle control device 1 generates the travel trajectory P12 along the virtual route R14 and controls the own vehicle C1 so as to follow the vehicle C2. As illustrated in FIG. 4(c), following the preceding vehicle C2, the own vehicle C1 waits on the guiding zone Z1 until a signal changes.

As described above, according to the vehicle control device 1 of the present embodiment, by changing a branching point based on road information according to the surroundings of the own vehicle, it is possible to smoothly and safely travel without disturbing surrounding traffic flow of the own vehicle.

The initial branching point DP11 based on the map corresponds to the "first branching point," and the branching point DP12 after the change corresponds to the "second branching point." The travel trajectory P11 before the change may be referred to as a first travel trajectory, and the travel trajectory P12 after the change may be referred to as a second travel trajectory.

FIG. 5 shows an operation example in the case where only one vehicle C2 is waiting for right turn with respect to the scene described in FIG. 4.

In FIG. 5(a), when the vehicle control device 1 confirms that there is the branching point DP11 on the route ahead of the own vehicle C1, it predicts future behavior of the vehicle C2 detected in front of the own vehicle C1. Since the vehicle C2 is positioned on the right-turn lane L12, the vehicle control device 1 can predict that the vehicle is a vehicle that will turn right at the next intersection L13.

When a travel trajectory of the own vehicle C1 is generated based on the information obtained from the route on the map, the travel trajectory is the travel trajectory P11. However, since the travel trajectory P11 based only on the route on the map moves so as to approach diagonally behind the vehicle C2 waiting for right turn, the own vehicle C1 blocks the straight lane L11 on which the own vehicle C1 has traveled. Therefore, when the own vehicle C1 moves according to the travel trajectory P11, the vehicle control device 1 determines that the vehicle disturbs surrounding traffic flow and shifts to a process for changing a branching point.

In such a scene, the own vehicle C1 should follow the rear side of the vehicle C2, such that the vehicle control device 1 determines the travelable area RA2 behind the vehicle C2. In this example, since the rear side of the vehicle C2 is the guiding zone Z1, the own vehicle C1 can travel in the guiding zone Z1. Therefore, the vehicle control device 1 extracts an area from the rear side of the vehicle C2 waiting for right turn to the start position of the guiding zone Z1 as the travelable area RA2.

When the travelable area RA2 can be extracted, the vehicle control device 1 changes the branching point DP11 defined by the map to a branching point DP13 positioned before the branching point DP11 as illustrated in FIG. 5(b), and a virtual route R15 is generated from the branching point DP13 and connects the virtual route R15 to the right-turn route R13 on the map. Then, the vehicle control device 1 generates a travel trajectory P13 along the virtual route R15 and controls the own vehicle C1 so as to follow the vehicle C3. As a result, as illustrated in FIG. 5(c), the own vehicle C1 waits for changing a signal on the guiding zone Z1 after the preceding vehicle C2 to be followed.

Here, in the method of changing a branching point on a route and the method of generating a virtual route described in FIGS. 4(b) and 5(b), the branching point may be changed, or a virtual route may be generated, such that the own vehicle C1 is positioned near the rear side of the object to be followed. The setting method in FIG. 4(b) is different from the setting method in FIG. 5(b), but the setting method in FIG. 5(b) may be adjusted to the setting method in FIG. 4(b). However, depending on the shape of the extracted travelable area, it is also assumed that the own vehicle C1 does not position near the rear side of the object to be followed. In such a case, for example, a position for changing a branching point is determined so as not to disturb a vehicle approaching from behind the own vehicle C1 as much as possible, and a virtual route is generated.

As described above, according to the vehicle control device 1 of the present embodiment, by changing a branching point according to the surroundings, smooth and safe traveling can be realized without disturbing the traffic flow around the own vehicle.

Figure 6:
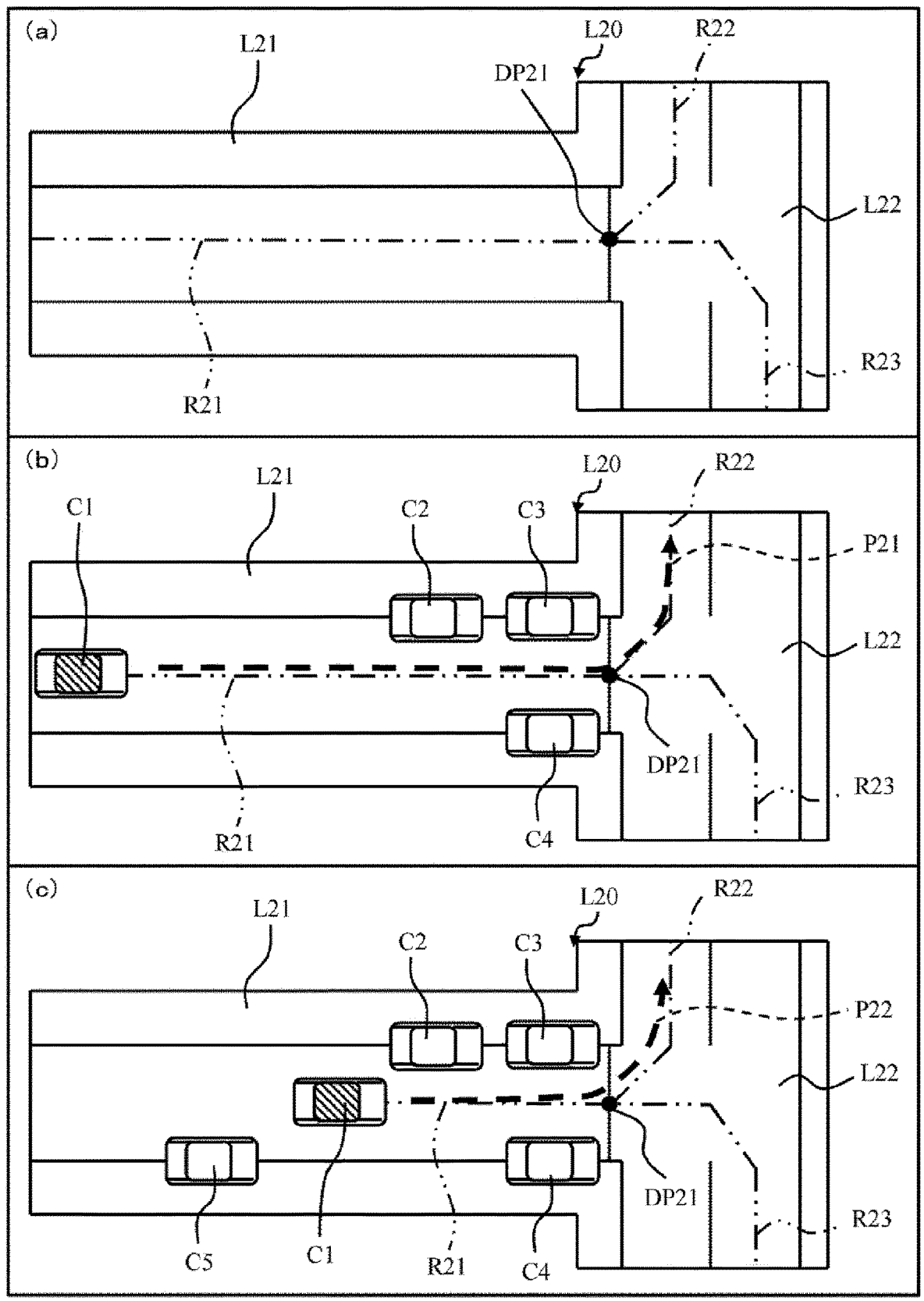
FIG. 6 illustrates explanatory views of a case where a vehicle does not consider obstructions on a T-shaped road.

FIG. 6 is a scene indicating a problem in the case where a travel trajectory is generated from the map information, as in FIG. 3.

FIG. 6(a) indicates the configuration of a road L20. An one-way lane L21 from the left side to the right side in the drawing is connected to a T-shaped intersection L22. In the map information, a route is branched into a route R22 for turning left at the T-shaped intersection L22 from a branching point DP21 at a point where the route R21 for traveling straight is connected to the intersection L22 and similarly into a route R23 for turning right at the intersection L22.

Here, it is assumed that the own vehicle C1 turns left. As illustrated in FIG. 6(b), if the own vehicle C1 comes close to the T-junction intersection, if the travel trajectory of the own vehicle C1 is generated based only on the route information on the map, a travel trajectory P21 is generated. That is, the own vehicle C1 travels straight ahead of the route R21, moves from the branching point DP21 to the route R22, and turns left at the intersection L22.

However, in the case of the scene illustrated in FIG. 3(b), even though the road is only one lane L21, vehicles are divided into two rows of vehicles C2 and C3 waiting for turning left and a vehicle C4 waiting for right turn before the intersection L22. Therefore, when the own vehicle C1 travels along the travel trajectory P21, as illustrated in FIG. 6(c), the own vehicle C1 moves toward the rear side of the vehicle C2 waiting for left turn. If the own vehicle C1 stops behind the last vehicle C2 waiting for left turn, the own vehicle C1 blocks the route of the vehicle C5 (a vehicle that will turn right) coming after the own vehicle C1. At the position of the own vehicle C1 in FIG. 6(b), the travel trajectory P22 is applied.

Figure 7:
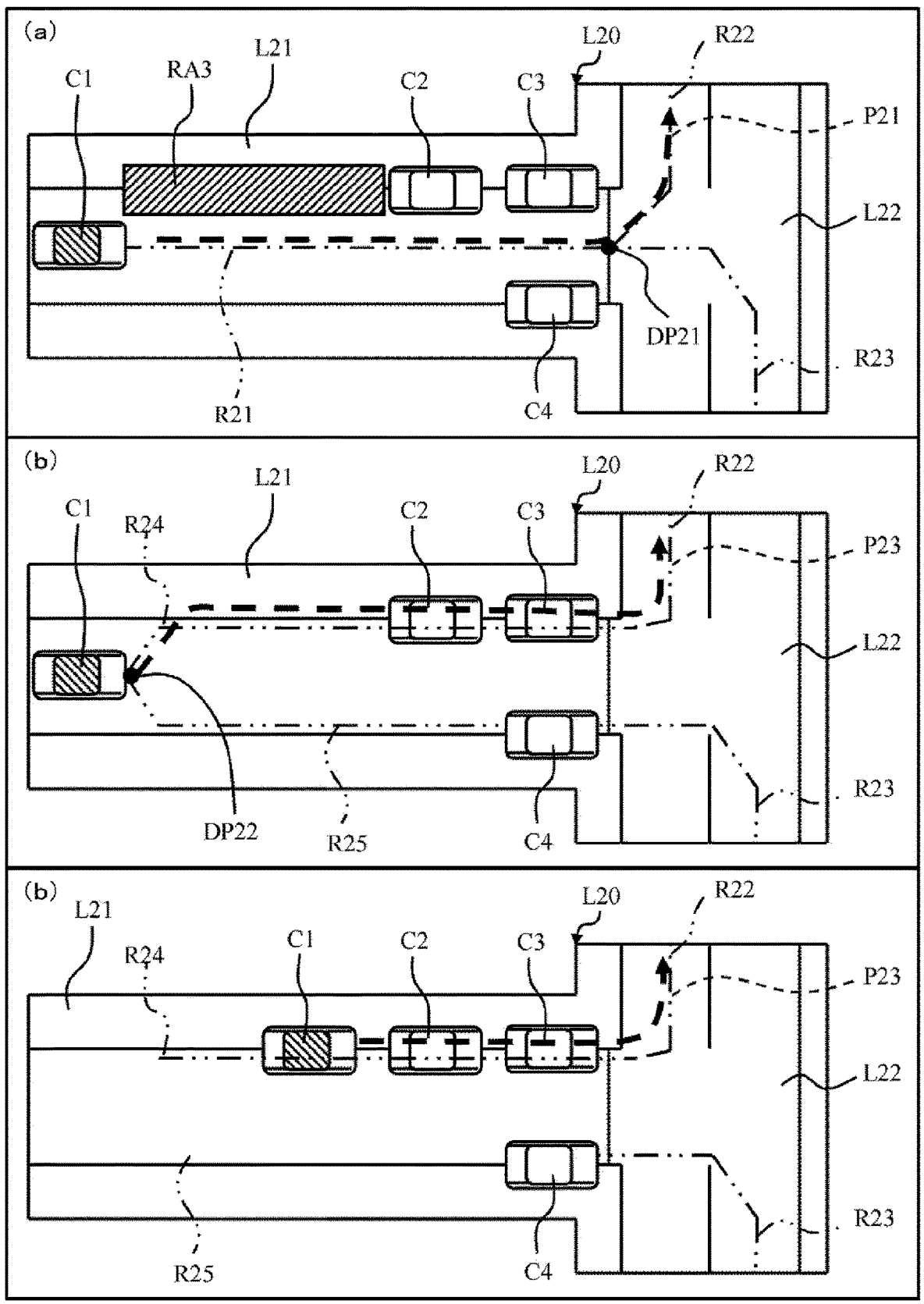
FIG. 7 illustrates explanatory views of an example in which a vehicle changes a travel trajectory in consideration of obstructions on a T-shaped road.

FIG. 7 is an example in which a vehicle control process of the present embodiment is applied to the problem scene in FIG. 6. First, in FIG. 7(a), when the vehicle control device 1 confirms that there is a branching point DP21 of the route ahead of the own vehicle C1, it predicts future behavior of the vehicle C2 and the vehicle C4 detected in front of the own vehicle C1.

The vehicle C2 stops beyond the lane L1 to the left, and the T-shaped intersection L22 is located ahead of the position the vehicle C2 stops. Therefore, the vehicle control device 1 can predict that the vehicle C2 will turn left at the next intersection L22.

On the other hand, the vehicle C4 stops beyond the lane L1 to the right, and a T-shaped intersection L22 is located ahead of the position. Therefore, the vehicle control device 1 can predict that the vehicle C4 will turn right at the next intersection L22.

As described in FIG. 6(b), the vehicle control device 1 determines that if the own vehicle C1 moves according to the travel trajectory P21 generated only by the information obtained from the route on the map, the own vehicle C1 moves to the center of preceding vehicles arranged in two rows, thus disturbs surrounding traffic flow. Therefore, the vehicle control device 1 changes a branching point. In such a scene, the own vehicle C1 should follow the rear side of the vehicle C2, such that the vehicle control device 1 determines the travelable area RA3 behind the vehicle C2. In this case, since the rear side of the vehicle C2 is an area including a road shoulder, the vehicle control device 1 extracts the travelable area RA3 on a road shoulder of the rear side of the vehicle C2.

When the vehicle control device 1 can extract the travelable area RA3, as illustrated in FIG. 7(b), the vehicle control device 1 changes the branching point DP21 defined in the map to the branching point DP22 positioned before the position where a vehicle row is divided into two. Then, the vehicle control device 1 generates a virtual route R24 from the branching point DP22 and connects the virtual route R24 to the left-turn route R22 prescribed on the map. The vehicle control device 1 generates a travel trajectory P23 along the virtual route R24 and controls the own vehicle C1 so as to follow the vehicle C2. As illustrated in FIG. 7(c), the own vehicle C1 stops on a road shoulder behind the vehicle C2 for waiting for left turn and waits for changing a signal. Note that, with the change from the change point DP21 to the change point DP22, a right-turn route R25 is generated from the change point DP22.

As described above, according to the vehicle control device 1 of the present embodiment, by changing a branching point according to the surroundings, smooth and safe traveling can be realized without disturbing the traffic flow around the own vehicle.

Figure 8:
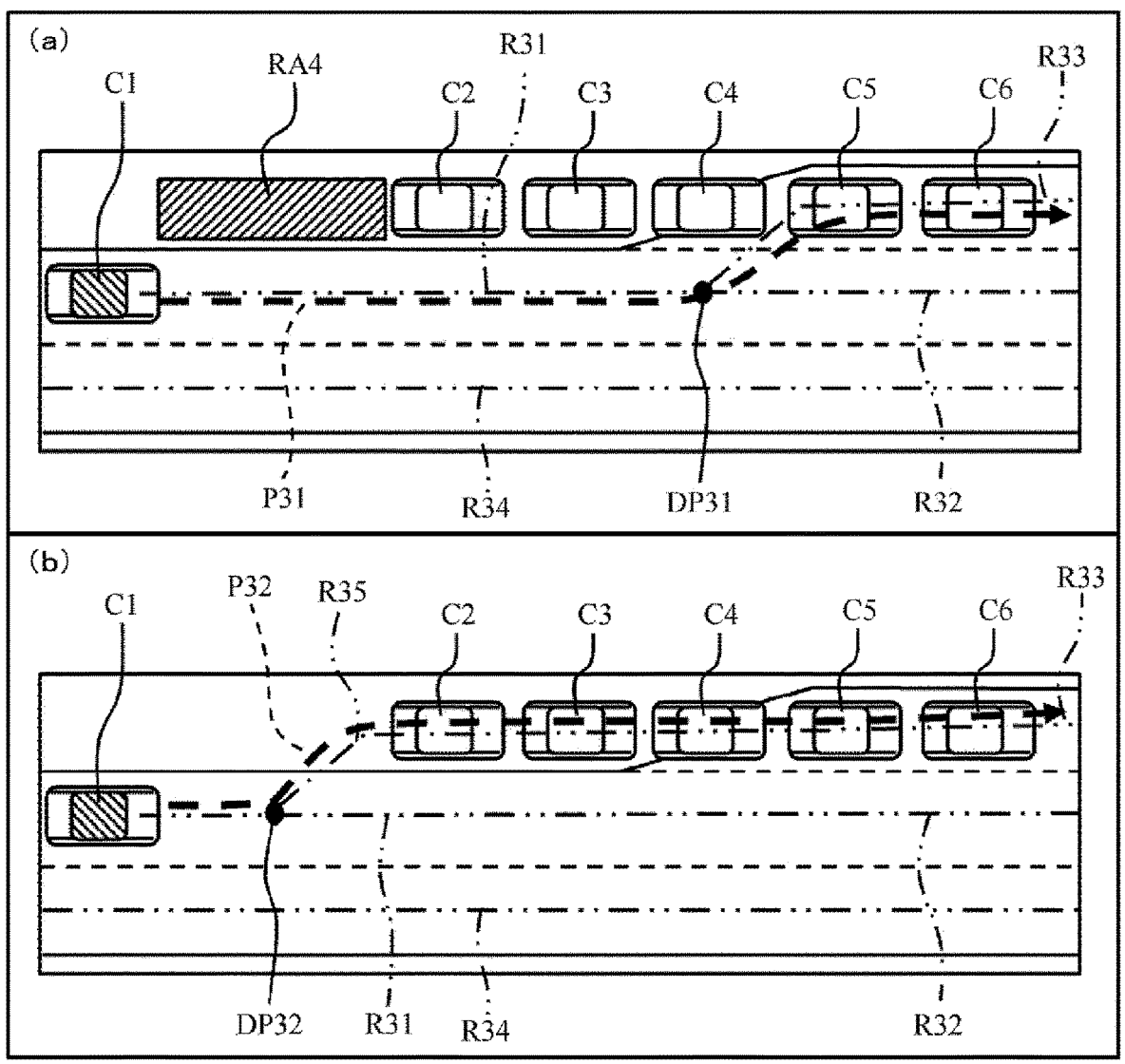
FIG. 8 illustrates explanatory views of an example of changing a travel trajectory in consideration of obstructions when the vehicle is heading to a lane branching from a road of two lanes on one side.

FIG. 8 indicates an example in which the vehicle control process of the present embodiment is applied to the scene indicating a problem in the case of branching from a two-lane road on one side.

As illustrated in FIG. 8(a), a case where the own vehicle C1 comes to a place where a branch lane appears from a two-lane road will be described as an example. In this case, the route information obtained from the map includes a straight route R31 from the position of the own vehicle C1 to a place where a branch lane appears, a route R32 going straight from the route R31 through a branching point DP31, and a route R33 branching from the branching point DP31 to a branch lane side.

Here, when a travel trajectory of the own vehicle C1 is generated based on the information on the route of the map, the travel trajectory P31 is generated. However, in this scene, the vehicles C2 to C6 branching from the main lane overflow from a branch lane to a road shoulder. Therefore, when the own vehicle C1 moves along the travel trajectory P31, the own vehicle C1 cut in between the vehicle C4 and the vehicle C5 waiting on a branch lane. Furthermore, if the own vehicle C1 stops at the cut-in point, the own vehicle C1 blocks a route of following vehicles.

When the vehicle control process of the present embodiment is applied to this situation, the following flow is obtained. First, in FIG. 8(a), when the vehicle control device 1 confirms that there is the branching point DP31 on the route ahead of the own vehicle C1, it predicts future behavior of the vehicle C2 detected in front of the own vehicle C1. The vehicle C2 stops on a road shoulder beyond to the left side from the lane, and the branch lane is located ahead of the position. Therefore, the vehicle control device 1 can predict that the vehicle C2 will travel on the branching lane.

When the own vehicle C1 moves along the travel trajectory P31 generated from the information obtained from the route on the map, the vehicle control device 1 determines that surrounding traffic is disturbed as described above, and the process is shifted to a process of changing a branching point. In such a scene, the own vehicle C1 should follow behind the vehicle C2, such that the vehicle control device 1 determines the travelable area behind the vehicle C2. In this case, since the rear side of the vehicle C2 is a road shoulder, the vehicle control device 1 extracts the road shoulder of the rear side of the vehicle C2 as the travelable area RA4.

When a travelable area RA4 can be extracted, the vehicle control device 1 changes from the branching point DP31 defined on the map to the branching point DP32 positioned before the start point of the travelable area RA4 as illustrated in FIG. 8(b). Then, the vehicle control device 1 generates the virtual route R35 from the branching point DP32 and connects the virtual route R35 to the route R33 of the branch lane on the map. The vehicle control device 1 generates a travel trajectory P32 along the virtual route R35 and controls the own vehicle C1 so as to follow the vehicle C2.

As described above, according to the vehicle control device 1 of the present embodiment, by changing a branching point according to the surroundings, smooth and safe traveling is possible without disturbing the traffic flow around the own vehicle.

Second Embodiment

Figure 10:
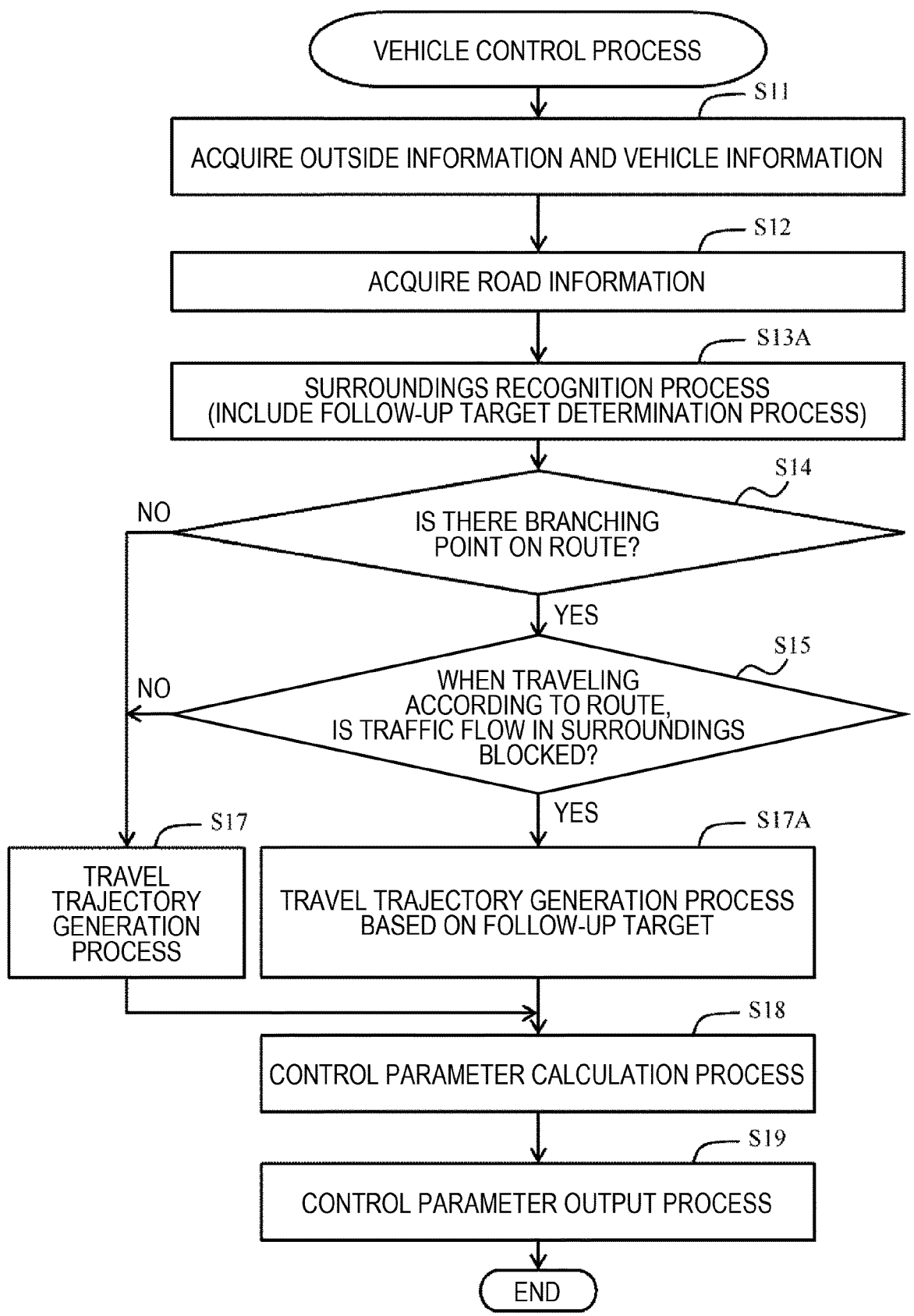
FIG. 10 is a flowchart of a vehicle control process.
Figure 11:
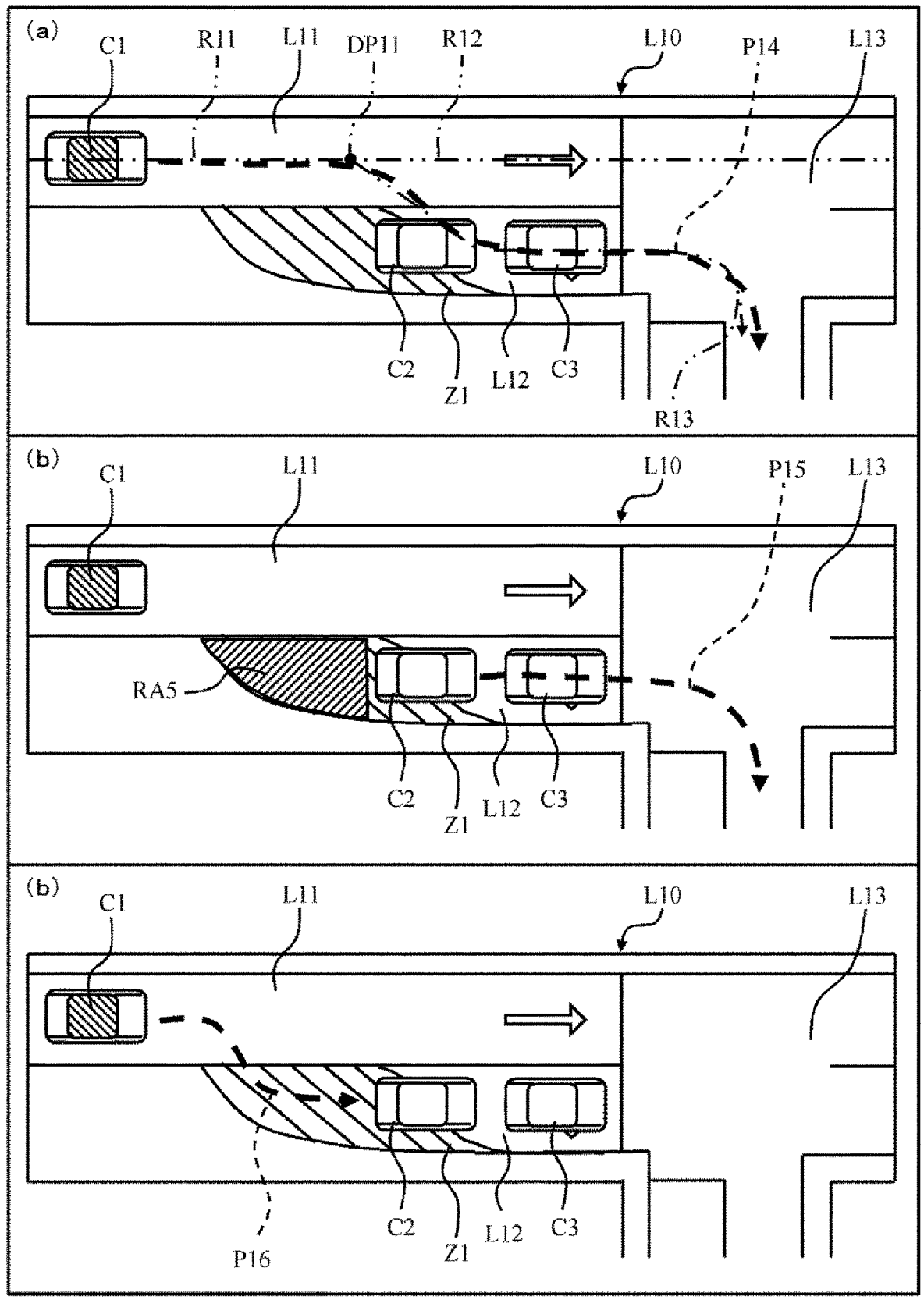
FIG. 11 illustrates explanatory views of an example of recognizing an obstruction ahead of the vehicle as a follow-up target and changing a travel trajectory.

A second embodiment of the present invention will be described below with reference to FIGS. 9 to 11. Since the present embodiment corresponds to a variation of the first embodiment, differences from the first embodiment will be mainly described.

Figure 9:
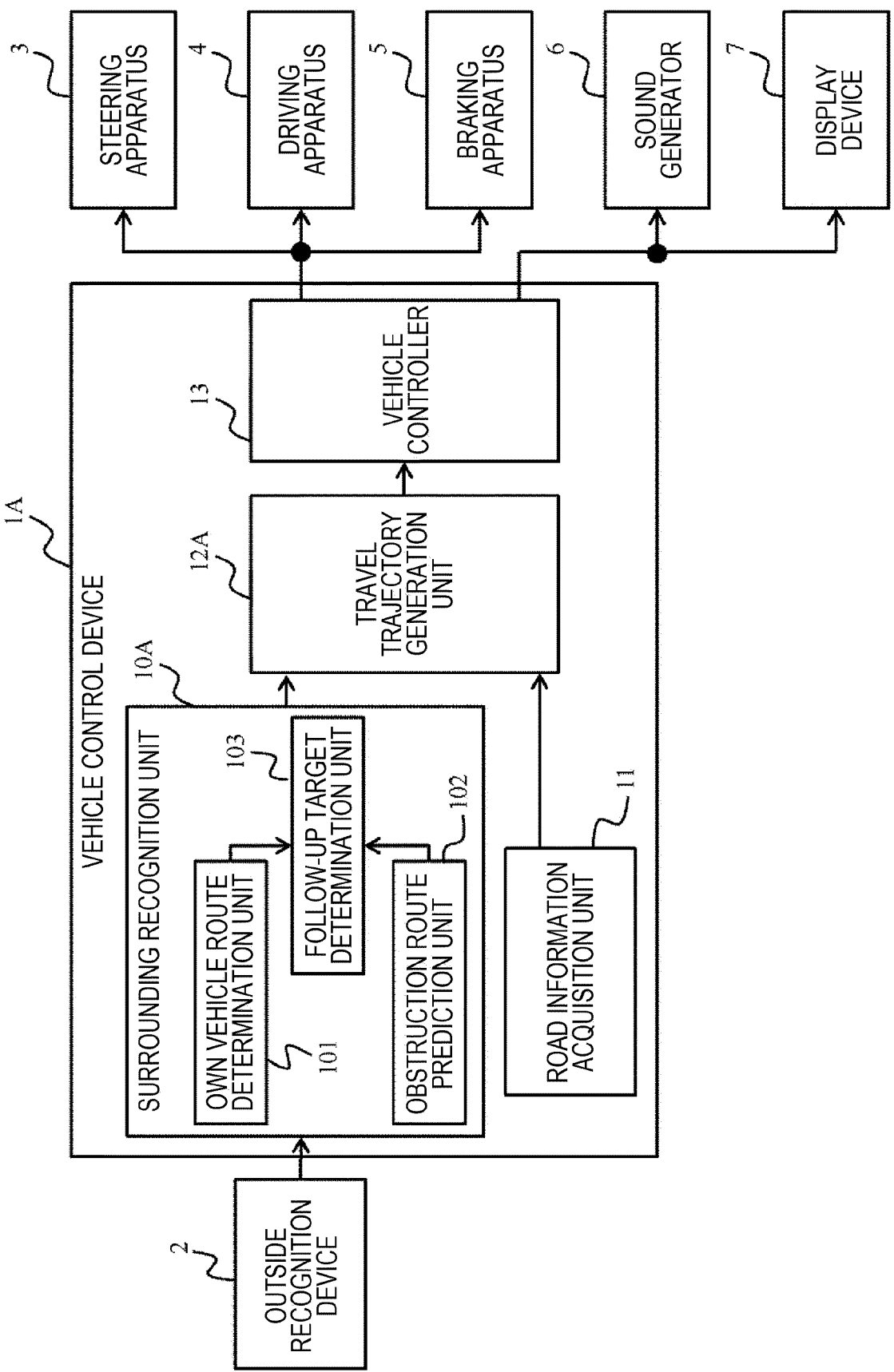
FIG. 9 is a functional block diagram of a vehicle control device according to a second embodiment.

FIG. 9 is a functional block diagram schematically indicating a vehicle control device 1A of the present embodiment. In the present embodiment, processes of a surrounding recognition unit 10A and a travel trajectory generation unit 12A are different from those of the first embodiment described in FIG. 1.

The travel trajectory generation unit 12A is a block having a function of generating a travel trajectory using follow-up target information of an obstruction, which is a new output of the surrounding recognition unit 10A.

The surrounding recognition unit 10A has functions such as an own vehicle route determination unit 101, an obstruction route prediction unit 102, and a follow-up target determination unit 103. The surrounding recognition unit 10A determines whether or not the own vehicle is to follow input obstruction information, adds follow-up target information as a determination result, and outputs it.

The own vehicle route determination unit 101 has a function of determining a route of the own vehicle from map information ahead of the vehicle. The obstruction route prediction unit 102 has a function of predicting a route of an obstruction from map information and the like around the obstruction.

The follow-up target determination unit 103 compares the route of the vehicle determined by the own vehicle route determination unit 101 with the route of an obstruction estimated by the obstruction route prediction unit 102, and determines whether the obstruction is a follow-up target of the vehicle. For example, when the route of the own vehicle and the route of an obstruction are in the same direction, the follow-up target determination unit 103 determines that the obstruction is a follow-up target of the own vehicle. On the other hand, when the route of the own vehicle and the route of an obstruction are not in the same direction, the follow-up target determination unit 103 determines that the obstruction is not a follow-up target of the own vehicle.

A vehicle control process of the present embodiment will be described with reference to the flowchart of FIG. 10. The vehicle control process of the present embodiment differs from the vehicle control process described in FIG. 2 in that the contents of steps S13A and S17A are different, and step S16 is not provided.

A vehicle control device 1A acquires outside information and vehicle information (S11), acquires road information (S12), and performs a process of grasping traveling environment around the own vehicle using the outside information acquired in step S11 and the road information acquired in step S12 (S13A). In step S13A, the vehicle control device 1A recognizes the surrounding environment including the determination process of the follow-up target by the follow-up target determination unit 103.

The vehicle control device 1A determines whether or not there is a branching point on the route ahead of the own vehicle (S14), and if there is a branching point (S14: YES), it determines whether or not the vehicle disturbs surrounding traffic flow when traveling according to the route (S15).

When there is a possibility of disturbing the surrounding traffic flow (S15: YES), the vehicle control device 1A generates a travel trajectory based on the follow-up target determined in step S13A (S17A). On the other hand, in the case where there is no branching point on the route (S14: NO) or the case where there is no possibility of blocking the surrounding traffic flow (S15: NO), in any case, the vehicle control device 1A generates a travel trajectory based only on the information on the route of the map (S17).

Then, the vehicle control device 1A calculates control a parameter for causing the own vehicle to travel according to the travel trajectory generated in either step S17 or S17A (S18), and outputs this control parameter each to the steering apparatus 3, the driving apparatus 4, and the braking apparatus 5 (S19).

An operation example of the present embodiment will be described with reference to FIG. 11. FIG. 11 are a diagram for explaining a scene assuming that the own vehicle C1 tries to change the lane to the right-turn lane L12 to make a right turn at an intersection ahead of the vehicle while the own vehicle C1 is traveling on a single lane road.

First, as illustrated in FIG. 11(a), a route P14 of the own vehicle C1 is determined as a route that passes from a straight route L11 to a right-turn lane L12 and turns right at an intersection L13.

Next, as illustrated in FIG. 11(b), the vehicle control device 1A predicts a route of the vehicle C2 in front of the own vehicle C1. Since the vehicle C2 is on the guiding zone Z1 before the intersection and then heads toward the right-turn lane L12, a route P15 of the vehicle C2 is predicted as a route for turning right at the intersection L13.

Here, when comparing the route P14 of the own vehicle C1 and the route P15 of the vehicle C2, since the vehicles are heading in the same direction, the vehicle control device 1A determines that the vehicle C2 is a follow-up target of the own vehicle C1. Further, when the vehicle control device 1A determines that the vehicle C2 is a follow-up target of the own vehicle C1, the vehicle control device 1A determines a travelable area RA5 for the own vehicle C1 to follow the vehicle C2. The vehicle C2 is positioned on the guiding zone Z1, and the area behind the vehicle C2 is also the guiding zone Z1. Therefore, the vehicle control device 1A extracts an area from the rear side of the vehicle C2 to the start position of the guiding zone Z1 as a travelable area RA5.

Finally, as illustrated in FIG. 11(c), the vehicle control device 1A generates a travel trajectory P16 for the own vehicle C1 to follow the vehicle C2 including the travelable area RA, and controls the own vehicle C1 so as to follow the vehicle C2.

As described above, the vehicle control device 1A according to the present embodiment enables smooth and safe traveling without disturbing the traffic flow around the own vehicle since the vehicle control device 1A determines whether or not the vehicle ahead is to be followed and generates a travel trajectory based on the determination result.

Not that, the above explanation is merely an example, and when interpreting the invention, there is no limitation or restriction on the correspondence between the descriptions in the above embodiments and the descriptions in claims. For example, in the above-described embodiments, it is assumed that the own vehicle is a passenger car, but the present invention is not limited thereto. The present invention is also applicable to travel control of, for example, construction machines and robots.

In addition, each constituent element of the present invention can arbitrarily be selected, and the invention having a constitution which is selected is also included in the present invention. Furthermore, the configurations described in claims can be combined with any combination besides those specified in claims.

At least a part or the whole of the configuration of the vehicle control devices 1 and 1A can be configured as at least one computer program. The computer program can be fixedly distributed in a storage medium such as a memory or can be transmitted via a communication medium such as a communication network.

Furthermore, the above-described embodiments include, for example, the following inventions.

"Expression 1.

A vehicle control device having: a surrounding recognition unit that recognizes the surroundings of the own vehicle; a road information acquisition unit that acquires road information; a travel trajectory generation unit that generates a travel trajectory for causing the own vehicle to travel on the basis of environment around the own vehicle recognized by the corresponding recognition unit and the road information acquired by the road information acquisition unit; and a vehicle controller that calculates a parameter for controlling the own vehicle based on the travel trajectory of the own vehicle generated by the travel trajectory generation unit, in which the travel trajectory generation unit changes a position of the branching point based on a travelable area of the own vehicle recognized by the surrounding recognition unit, and changes the travel trajectory based on the changed branching point, when it is determined that there is a branching point of the route within a predetermined range ahead of the own vehicle based on the road information acquired by the road information acquisition unit, and an obstruction exists in the predetermined range ahead of the own vehicle based on information on the surroundings of the own vehicle acquired by the surrounding recognition unit."

"Expression 2.

A vehicle control device which is connected to an outside recognition device that outputs information for recognizing the surroundings of the vehicle, in which the outside recognition device includes at least one of a stereo camera, a monocular camera, a millimeter wave radar, a laser radar, and an ultrasonic sensor."

"Expression 3.

A vehicle control method for controlling a travel trajectory of a vehicle based on a predetermined route in accordance with a road, including the steps of:

recognizing the surroundings of a vehicle;

detecting a first branching point in a first route that is preset on a road;

in cases in which a prescribed condition is met by the presence of an obstruction detected from the recognized surroundings when the vehicle is to move along a travel trajectory that is based on at least one second route among a plurality of second routes that branch from the first branching point, generating a virtual route which branches from the first route at a second branching point differing from the first branching point toward the selected second route, and modifying the travel trajectory on the basis of the generated virtual route."

REFERENCE SIGNS LIST 1, 1A vehicle control device
2 outside recognition device
3 steering apparatus
4 driving apparatus
5 braking apparatus
6 sound generator
7 display device
10, 10A surrounding recognition unit
11 road information acquisition unit
12, 12A travel trajectory generation unit
13 vehicle controller

The invention claimed is:

1. A vehicle control device configured to control a travel trajectory of a vehicle based on a route determined in advance according to a road,
wherein the vehicle control device is configured to:
recognize the surroundings of the vehicle;
detect a first branching point in a first route that is preset on a road; and in cases in which a prescribed condition is met by the presence of an obstruction detected from the recognized surroundings when the vehicle is to move along a travel trajectory that is based on at least one second route selected from among a plurality of second routes that branch from the first branching point, generate a virtual route which branches from the first route at a second branching point differing from the first branching point toward the selected second route, and modify the travel trajectory on the basis of the generated virtual route, wherein the recognized surroundings are based on map data, the map data including passing lanes, left-turn lanes, right-turn lanes, zebra zones, traffic lights and traffic signs, wherein the virtual route is generated including an area outside of a lane of the road and including an area in which the vehicle can move.

2. The vehicle control device according to claim 1, wherein the obstruction is another vehicle in a predetermined range of the vehicle when it is assumed that the vehicle has reached the first branching point.

3. The vehicle control device according to claim 2, wherein the second branching point is set in front of the first branching point in a traveling direction.

4. The vehicle control device according to claim 3, wherein the prescribed condition is a case of blocking the movement of the obstruction moving along the second route when the vehicle moves along a travel trajectory before the change.

5. The vehicle control device according to claim 4, wherein the second branching point is set at a position where the vehicle does not block the movement of the obstruction.

6. The vehicle control device according to claim 1, wherein the virtual route is generated in an area heading backward of the obstruction from the vehicle.

7. The vehicle control apparatus according to claim 1, wherein when the travel trajectory is to be changed, the change is notified to an occupant in the vehicle.

8. The vehicle control device according to claim 1, wherein the virtual route is generated on a guiding zone for guiding the movement of the vehicle, the guiding zone being a zebra zone.

9. A vehicle control device configured to determine a route of a vehicle based on map information and to output a control target value,
wherein the vehicle control device is configured to:
change a branching point on a route determined in advance by using the map information based on an obstruction ahead of the vehicle and an area where the vehicle can travel,
generate a virtual route based on the changed branching point, and
store information on the changed branching point and the virtual route,
wherein the map information includes passing lanes, left-turn lanes, right-turn lanes, zebra zones, traffic lights and traffic signs, and
wherein the virtual route is generated including an area outside of a lane of a road and including an area in which the vehicle can move.

10. The vehicle control vehicle according to claim 9, wherein a travel trajectory of the vehicle is generated based on the virtual route, and a control target value for the vehicle to move along the generated travel trajectory is output.

11. The vehicle control vehicle according to claim 9, wherein the virtual route is generated on a guiding zone for guiding the movement of the vehicle, the guiding zone being a zebra zone.

* * * * *